United States Patent
Bauerly et al.

(10) Patent No.: US 10,929,470 B1
(45) Date of Patent: Feb. 23, 2021

(54) PERSONALIZED DECISION ENGINE

(71) Applicant: X Development LLC, Mountain View, CA (US)

(72) Inventors: Michael Patrick Bauerly, Sunnyvale, CA (US); Johan Ulrich Lewin Jessen, Mountain View, CA (US); Matthew David Day, Oakland, CA (US); Matthew Sibigtroth, Richmond, CA (US); Preeti Murali Talwai, El Dorado Hills, CA (US)

(73) Assignee: X Development LLC, Mountain View, CA (US)

( * ) Notice: Subject to any disclaimer, the term of this patent is extended or adjusted under 35 U.S.C. 154(b) by 735 days.

(21) Appl. No.: 15/395,208

(22) Filed: Dec. 30, 2016

(51) Int. Cl.
*G06F 16/00* (2019.01)
*G06F 16/903* (2019.01)
*G06N 5/02* (2006.01)

(52) U.S. Cl.
CPC ....... *G06F 16/90335* (2019.01); *G06N 5/022* (2013.01)

(58) Field of Classification Search
CPC ............... G06F 16/3331; G06F 16/245; G06F 16/90335; G06F 16/248; G06F 16/9535; G06F 16/24578; G06F 16/337; G06F 16/284; G06F 16/334; G06Q 30/0256; G06Q 40/123; Y10S 707/99931
See application file for complete search history.

(56) References Cited

U.S. PATENT DOCUMENTS

| | | | |
|---|---|---|---|
| 7,930,302 B2 | 4/2011 | Bandaru et al. | |
| 8,352,396 B2 | 1/2013 | Forman et al. | |
| 9,047,560 B2 | 6/2015 | Gunawardana et al. | |
| 10,019,513 B1* | 7/2018 | Koren | G06F 16/3344 |
| 2003/0101153 A1* | 5/2003 | Francis | G06Q 10/10 706/47 |
| 2004/0107181 A1* | 6/2004 | Rodden | G06F 16/40 |
| 2007/0073664 A1* | 3/2007 | Ahn | G06F 16/2471 |
| 2008/0082518 A1* | 4/2008 | Loftesness | G06Q 10/02 |
| 2009/0216435 A1* | 8/2009 | Zheng | G06Q 10/10 701/533 |
| 2012/0109953 A1* | 5/2012 | Brown | G06Q 10/063 707/736 |
| 2013/0018882 A1* | 1/2013 | Listermann | G06Q 50/01 707/736 |
| 2013/0091128 A1* | 4/2013 | Radinsky | G06N 5/045 707/723 |

(Continued)

FOREIGN PATENT DOCUMENTS

| | | | | |
|---|---|---|---|---|
| DE | 10161959 A1 * | 7/2003 | | G06N 3/004 |
| EP | 0915422 | 1/2006 | | |

*Primary Examiner* — Augustine K. Obisesan
(74) *Attorney, Agent, or Firm* — Fish & Richardson P.C.

(57) ABSTRACT

A method of providing decisions to user queries includes: receiving, by at least one processor, a query transmitted from a client device; identifying, from a query database, a first query model; applying, by the at least one processor, the identified first query model to multiple user experience data entries from a user experience database, to obtain at least one correlation resulting from the application of the first query model to the multiple user experience data entries; and identifying, by the at least one processor, an answer to the query from the at least one correlation.

19 Claims, 9 Drawing Sheets

(56) References Cited

U.S. PATENT DOCUMENTS

| | | | |
|---|---|---|---|
| 2015/0088921 A1* | 3/2015 | Somaiya | G06F 16/248 707/767 |
| 2016/0140189 A1* | 5/2016 | Amitai | G06F 3/0482 707/722 |
| 2016/0335261 A1* | 11/2016 | Salvetti | G06F 16/2455 |
| 2017/0032251 A1* | 2/2017 | Podgorny | G06N 5/022 |

* cited by examiner

PERSONALIZED DECISION ENGINE

TECHNICAL FIELD

The present disclosure relates to a personalized decision engine and method for operating the same.

BACKGROUND

A person asking an open-ended question oftentimes seeks an answer that is particular to the person's specific circumstances and context. For example, providing effective responses to questions ranging from "Should I move to Boston" to "Would I benefit from switching careers" may require an understanding of the person's background as well as the context in which the query is made. Furthermore, the answers to such queries are not necessarily static for the person over time and may evolve as the user's life situation evolves.

SUMMARY

The present disclosure relates to a personalized real-time decision engine and method for operating the same.

In general, in one aspect, the subject matter of the present disclosure may be directed to an artificial intelligence-based system that generates and maintains a decision graph for making decision recommendations unique to different users. The system employs a database of user experiences across multiple different users. The user experiences include questions the user faces over their life (as well as when those questions were faced) and answers to the questions the user made, including feedback on how the answer affected the user's life experience. The system further utilizes a query model that analyzes the user experience database for a particular question, as it pertains to a particular user, to identify correlations. For instance, for a query posed by a user who is 35 years old, lives in a rural area, and has a particular occupation, the system may identify answers from similarly situated persons to comparable questions and evaluate not only the similarly situated persons' immediate outcomes following their response, but also their status over an extended period of time. Correlations between responses and outcomes, over both the near and long-term, then may be identified and weighted based on various factors. From identification of the correlations, the system may identify at least one answer to the user's particular question. The at least one answer may be ranked depending on the strength of the identified correlations, among other factors. The system may be trained initially by farming questions out, in part, to experts and recording their answers. Machine learning may be used to identify correlations between answers for particular users. Once a user makes a particular decision, the outcome of that decision (e.g., in terms of benefit to the user, such as an increase in perceived happiness or satisfaction) is fed back to the system to update the weightings. Feedback may be obtained explicitly (e.g., direct query of the user) or implicitly (e.g., through physical sensors).

In general, an innovative aspect of the subject matter described in this specification can be embodied in methods that include the actions of: receiving, by at least one processor, a query transmitted from a client device; identifying, by the at least one processor, a first query model using a query database; applying, by the at least one processor, the first query model to multiple user experience data entries from a user experience database, to obtain at least one correlation resulting from the application of the first query model; and identifying, by the at least one processor, an answer to the query from the at least one correlation. Other embodiments of this aspect include corresponding systems, apparatus, and computer programs, configured to perform the actions of the methods, encoded on computer storage devices.

Implementations of the methods may include one or more of the following features. For example, in some implementations, the methods may include: obtaining multiple correlations resulting from the application of the first query model; ranking the multiple correlations to provide ranked correlations; and identifying the answer to the query from the ranked correlations.

In some implementations, the methods further include applying the query model to the multiple user experience data entries for a specified time-frame.

In some implementations, the methods further include: outputting, to the client device, the answer as a recommendation; obtaining feedback on the effect of the answer to a user's life experience; and updating the user experience database with the feedback. The feedback may include a measurement signal obtained from a sensor device.

In some implementations, the methods include: periodically analyzing the user experience database to identify correlations that are relevant to a particular user; selecting, based on the correlations that are relevant to the particular user, a second query model; and outputting, to the client device, a question from the second query model.

In general, another innovative aspect of the subject matter described in this specification can be embodied in an apparatus that includes: at least one processor; and at least one memory device having a) a user experience database including multiple user experience data entries, in which each user experience data entry includes data, for a corresponding user, characterizing decisions made by the user and outcomes for the corresponding user at multiple different points in time over a time period particular to the corresponding user, b) a query model database including multiple query models, in which each query model of the multiple query models includes a unique question and an identification of at least one factor necessary to answer the question, and in which each query model is configured to identify correlations when the query model is applied to user experience data entries from the user experience database, and c) processor instructions that, when executed by the at least one processor, cause the at least one processor to perform operations including: applying a first query model from the query model database to the multiple user experience data entries from the user experience database, to obtain at least one correlation resulting from the application of the first query model; and generating an answer to the question of the first query model from the at least one correlation. Other embodiments of this aspect include corresponding systems and methods.

Implementations of the apparatuses may include one or more of the following features. For example, in some implementations, the processor instructions, when executed by the at least one processor, cause the at least one processor to perform operations including: obtaining multiple correlations resulting from the application of the query model to the user experience database; ranking the multiple correlations to obtain ranked correlations; and generating the answer to the question of the first query model according to the ranked correlations.

In some implementations, the processor instructions, when executed by the at least one processor, cause the at least one processor to perform operations including: applying, for the user, the first query model to the multiple user experience data entries for a specified time-frame.

In some implementations, the processor instructions, when executed by the at least one processor, cause the at least one processor to perform operations including: outputting the identified answer as a recommendation; obtaining feedback on the effect of the identified answer to the user's life experience; and updating the user experience database with the feedback. The feedback may include a measurement signal obtained from a sensor device.

In some implementations, the processor instructions, when executed by the at least one processor, cause the at least one processor to perform operations including: receiving, from a computer-implemented peripheral device, a query from the particular user; and identifying, from the query database, the first query model.

In some implementations, the processor instructions, when executed by the at least one processor, cause the at least one processor to perform operations including: periodically analyzing the user experience database to identify correlations that are relevant to the user; selecting, based on the correlations that are relevant to the particular user, the first query model; and outputting, to a computer-implemented peripheral device, the question from the first query model.

Particular embodiments of the subject matter described in this specification can be implemented so as to realize one or more of the following advantages. For example, in some implementations, the systems, apparatuses, methods, and programs may be used to provide expert advice to users on a wide variety of different subjects and topics in real-time, without the user having to wait for an actual human expert to receive the query and respond to the user. The advice may be in the form of an answer to a query or a recommendation that is uniquely based on the user's particular demographic and/or personal context. In certain cases, the recommendations can be provided spontaneously, without the user first providing a query.

The details of one or more embodiments, implementations and aspects are set forth in the accompanying drawings and the description below. Other features and advantages will be apparent from the description, the drawings, and the claims.

BRIEF DESCRIPTION OF THE DRAWINGS

Like reference symbols in the various drawings indicate like elements.

DETAILED DESCRIPTION

In general, in one aspect, the subject matter of the present disclosure may be directed to a system that keeps track, for multiple users, each user's life context (e.g., age, career, eating habits, exercise habits, tastes, and needs, among other features) and the queries that are asked of it by the user. The system further provides recommendations to the users in response to their queries that are unique to the particular user asking the question. Whether the users follow the recommendations or not, the system may obtain feedback regarding the users' ultimate decisions and incorporates that feedback to update future analysis.

The system may integrate domain expertise from experts in a particular field of knowledge and/or based on a collective analysis of user experiences to answer open-ended questions (e.g., should I buy a particular car or should I move to a new city). In some implementations, the system may propose, unprompted, questions to users based on the collective analysis. Alternatively, the queries may be proposed to further develop the system's understanding of the user's life context. The collective analysis may be based upon a decision graph derived from users having a similar life context. The system may keep track of user goals and prod the user to make decisions that have greater probability of achieving the specified goals.

Figure 1:
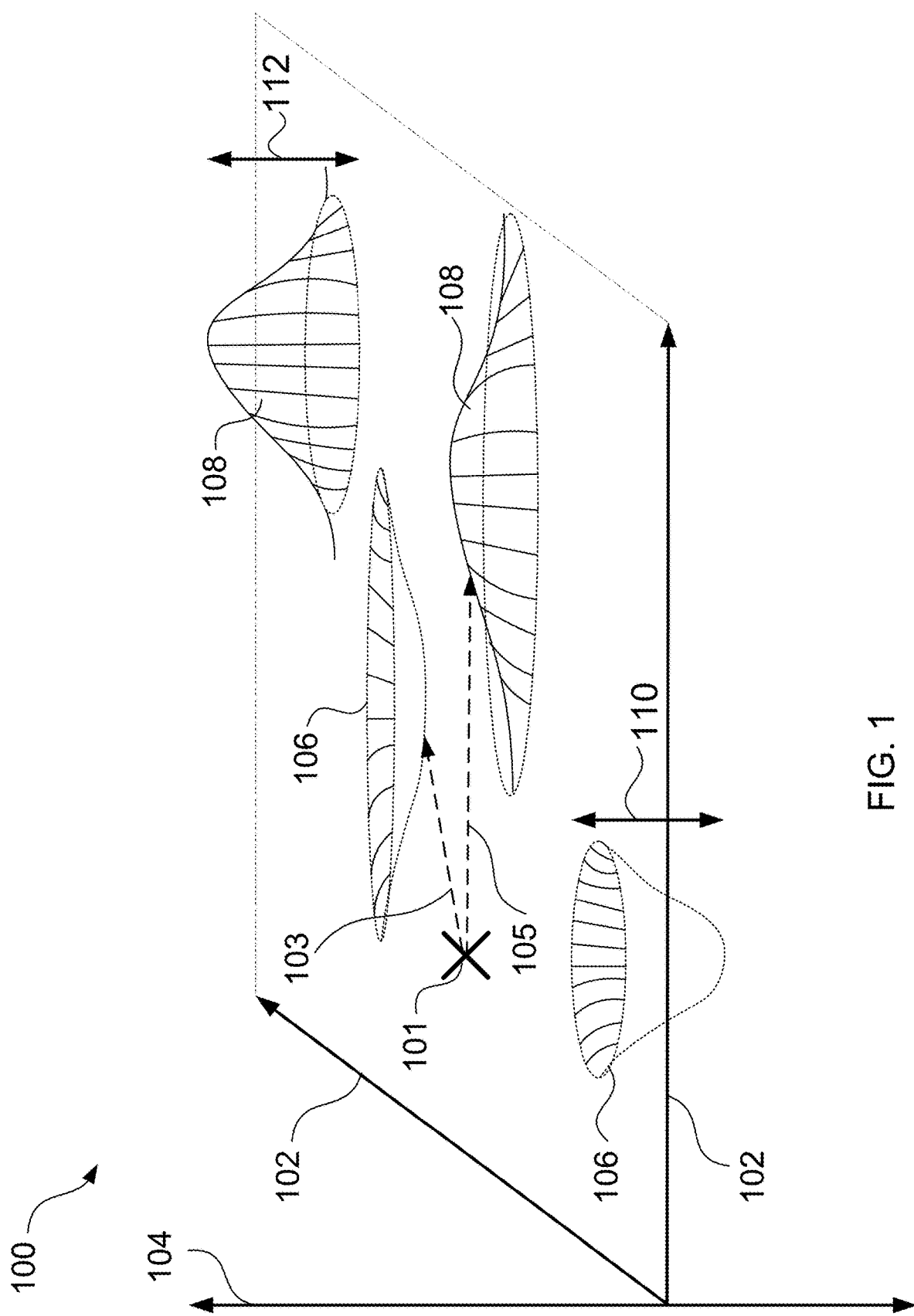
FIG. 1 is a schematic illustrating an example of a decision graph that shows an overall assessment of the value of different decisions made by a particular user over the course of an extended period, with optimal decisions occurring at peaks, and sub-optimal decisions occurring at positions lower than peaks.

FIG. 1 is a schematic illustrating an example of a decision graph 100 that shows a predictive assessment of the cumulative effect of different possible decisions made by a particular user over the course of an extended period. The graph includes time axes 102 and a value axis 104. The decision graph 100 may be understood as a mapping out of relational nodes between decision points and the cumulative value associated with each decision. The cumulative value of those decisions is shown as a continuously varying plane having variations in the value 104, such as local minimums 106 and local maximums 108, though other surface variations are possible. The local minimums 106 may be associated with values 104 that are relatively negative 110 to some average factor, whereas the local maximums may be associated with values 104 that are relatively positive 112 to some average factor. Decisions made earlier in time are located near the origin, whereas decisions made later in time occur near the far ends of axes 102. The value 104 may include a metric that is relevant to the user and that is potentially affected by the decisions being made. For instance, the value 104 may include a numeric value representative of expected happiness or contentment the user may experience. Alternatively, the value 104 may include other metrics, such as health, with positive or larger values indicative of better relative overall health and negative or smaller values indicative of worse relative overall health. Graph 100 presents an expected valuation as the result of different possible decisions that a user may make over time.

Thus, as a user makes decisions (e.g., over the course of their life), the user may be more likely to reach an area where the value 104 is higher or lower, depending on the particular set of decisions the user made. For example, a user at a point in time 101 on the graph may make a series of decisions (identified by path 105) that result in the user reaching a value 104 later in life, as predicted by graph 100, that has a local maximum 108. As explained above, this value 104 could be a "happiness" factor or some other factor indicative of a user's contentment. Alternatively, if the user makes a different series of decisions (identified by path 103), the user may end up in a region 106, as predicted by graph 100, associated with a local minimum in the value 104. While the 3D graph 100 shown in FIG. 1 is inherently restricted to visually representing the number of decisions and the cumulative value that along two time axes, the decision graph is not limited in practice to two time axes. Other decision graphs having a different number of time axes along which different possible outcomes can be plotted may be produced and represented computationally, even if they are not capable of being presented visually.

The present disclosure relates to an artificial intelligence-based system that is capable of generating and maintaining a decision graph, such as graph 100, for making decision recommendations unique to a user. The system employs a database of user experiences across multiple different users. The user experiences may include questions the user may have faced over a period of time. Alternatively, or in addition, the user experiences may include information about decision points where the user had to choose between multiple different options. These questions and decisions may include open-ended questions, such as, e.g., whether to accept a job offer or stay in one's current job, and whether to move to a different city, among other questions.

The user experiences may also include information about when the questions or decision points occurred, as well as answers to the questions based on decisions that the user has made, including feedback on how the answer affected the user's life experience. In some implementations, the user experiences may also include recommendations that experts have suggested for particular questions or decision points. The database of user experiences may be an "opt-in" system that allows users to agree to storage of their user experiences. Alternatively, or in addition, the database of user experiences may aggregate and store information in a privacy protected manner such that personally identifiable information is not shared or made available.

The system further utilizes query models that are configured to evaluate user queries and analyze the user experience database to identify correlations among the answers or decisions similarly situated users have made to similar queries and the outcomes for such similarly situated users. For instance, a user who is 35 years old living in Billings, Mont. may submit to the system a query as to whether they should move to Portland, Oreg. The system may then identify similar queries answered by similarly situated users (e.g., similar age, geographic location, and occupation), as well as the outcome of those decisions in terms of one or more different parameters of interest (e.g., happiness, contentment, health, or wealth, among other parameters) over the near term and/or long term to identify possible correlations with the results of their decisions. Depending on the parameter of interest that is being tracked as well as the correlations that are identified, the system then may identify a recommended decision that has a greater probability of providing the user with their desired outcome (e.g., greater happiness, greater wealth, or greater health). Thus, the recommendations would be unique to the user's demographics and experience, instead of predetermined, canned responses. Whether or not the user follows the proposed recommendation, the system records the user's feedback regarding their decision (e.g., in terms of benefit to the user, such as an increase in perceived happiness, satisfaction, wealth, or health). The feedback may be obtained through explicit responses from the user and/or through indirect quantitative measurements. For instance, in the case the system attempts to identify the benefit of the decision to a person's health, the system may record, from physical sensors, quantitative measurements such as, e.g., metabolic rhythm, body mass index, sleep patterns, among other factors. The system then may use the feedback to further refine the recommendation analysis.

Figure 2:
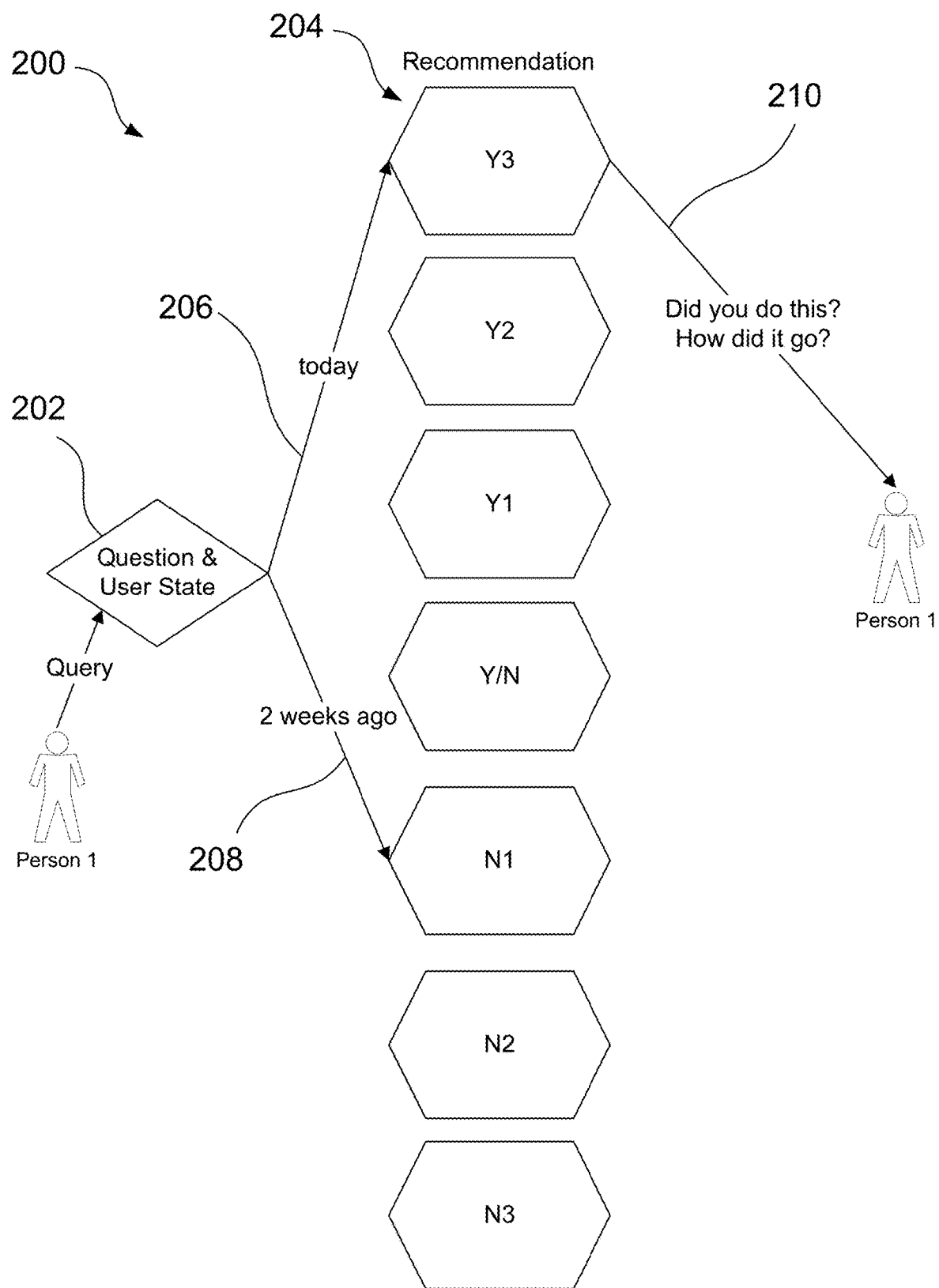
FIG. 2 is a schematic illustrating an example of Markov state diagram for generating a portion of a decision graph.

Part of the process for creating a decision graph according to the present disclosure, such as the decision graph 100, may be represented using a state diagram such as the exemplary process 200 depicted in FIG. 2. As shown in process 200, a user (Person 1) presents a query to the system. The system analyzes the query and determines what factors related to the user are required to answer the question or to provide a recommendation. Factors related to the user may be referred to as the "user state" and may include information such as, but not limited to, the user's age, weight, height, sex, occupation, residence, marital status, eating habits, exercise habits, education, or hobby interests, financial goals, or health goals, among other information.

The combination of the query that has been raised and the factors required for answering the query may be referred to as a query model 202. Different queries may require different types and amount of information in order for the system to provide an answer or recommendation. For instance, the system may determine that, to answer a particular query from Person 1, information regarding Person 1's occupation, income, and health goals are required. Alternatively, the system may determine that, to answer the query, more or less information is required. Depending on the nature of Person 1's query and Person 1's user state at the time the query is raised, the system then may identify a set 204 of potential responses (e.g., recommendations or answers) for Person 1. The identified set 204 of responses may be obtained by evaluating the database of user experiences to construct a decision graph, such as graph 100, and ascertaining from the decision graph, correlations among responses from users characterized by similar user states and who have raised similar queries. In some implementations, the set 204 of potential responses may be ranked according to each response's probability of increasing a metric of relevance to the user (e.g., happiness, contentment, health, or wealth, among others).

For example, in response to a query as to whether Person 1 should move, the system might identify multiple different responses in which the responses are ranked from those that recommend moving to those that do not recommend moving. Of the responses that recommend moving, each response may suggest moving to a different geographic location. Moreover, each of the responses that recommend moving may be ranked according to their probability of improving a metric (e.g., happiness, health, or wealth, among other metrics). The response having a metric associated with the highest probability of improving Person 1's desired metric then may be suggested to Person 1.

Subsequent to providing the recommendation to the user query, the system may obtain feedback 210 from Person 1. The feedback 210 may include, for example, a response from Person 1 as to whether Person 1 followed the recommendation and, if not, what course of action Person 1 did follow (which may be used as data to help identify correlations for other users). Additionally, the feedback 210 may include Person 1's assessment of the benefit of the recommended decision. Person 1's assessment may be related to a particular metric desired by Person 1 (e.g., happiness, health, or wealth). In some implementations, Person 1's assessment may be in the form of a descriptive assessment (e.g., with qualifiers) or in the form of a rating (e.g., a numeric value indicative of how closely the recommendation enabled Person 1 to pursue their desired metric). In some implementations, the feedback may be solicited directly from Person 1 through, e.g., the system directly questioning Person 1. In some implementations, the feedback may be solicited indirectly. For instance, one or more physical sensors (e.g., microphones, video cameras, and/or still cameras, among other sensors) may be used to capture bio-indicators (e.g., pulse, breath rate, eye movement, and/or voice pitch and volume, among others) that are suggestive of how Person 1 feels about their selected course of action. For instance, the sensors may identify cues as to Person 1's mental distress, physical fatigue or other conditions. Indirect feedback may include prompting Person 1 with questions that do not directly relate to their recent decision, including, for example questions such as "How do you feel?", "How is your morning?" or "How did your presentations go"? In some implementations, the feedback may be obtained soon after Person 1 chooses a course of action (e.g., immediately after, within minutes after, or within hours after the decision) and/or at various times long after Person 1 the chooses a course of action (e.g., days after, weeks after, months after or years after the decision).

Given that the response selection is derived in part by analyzing user experiences from similar user states, the particular response provided to a user may depend on the particular time frame in which the query was raised. For instance, referring again to the example of Person 1 asking the system whether Person 1 should move, the system may provide a first recommendation 206 if the query is made today versus a second different recommendation 208 if the query was made two weeks ago. The difference in recommendations may be due to various factors that may have changed in either Person 1's state over the two-week time frame, such as a change in occupation, a change in income, or a change in marital status, among other possible changes. Alternatively, or in addition, the difference in recommendations may be due to factors that have changed in the user experience database over the two-week time frame, such as an influx of information about the outcome of other similarly situated users following similar queries. Thus, the recommendation or answer that the system provides may vary over time, depending on the user's state.

Figure 3:
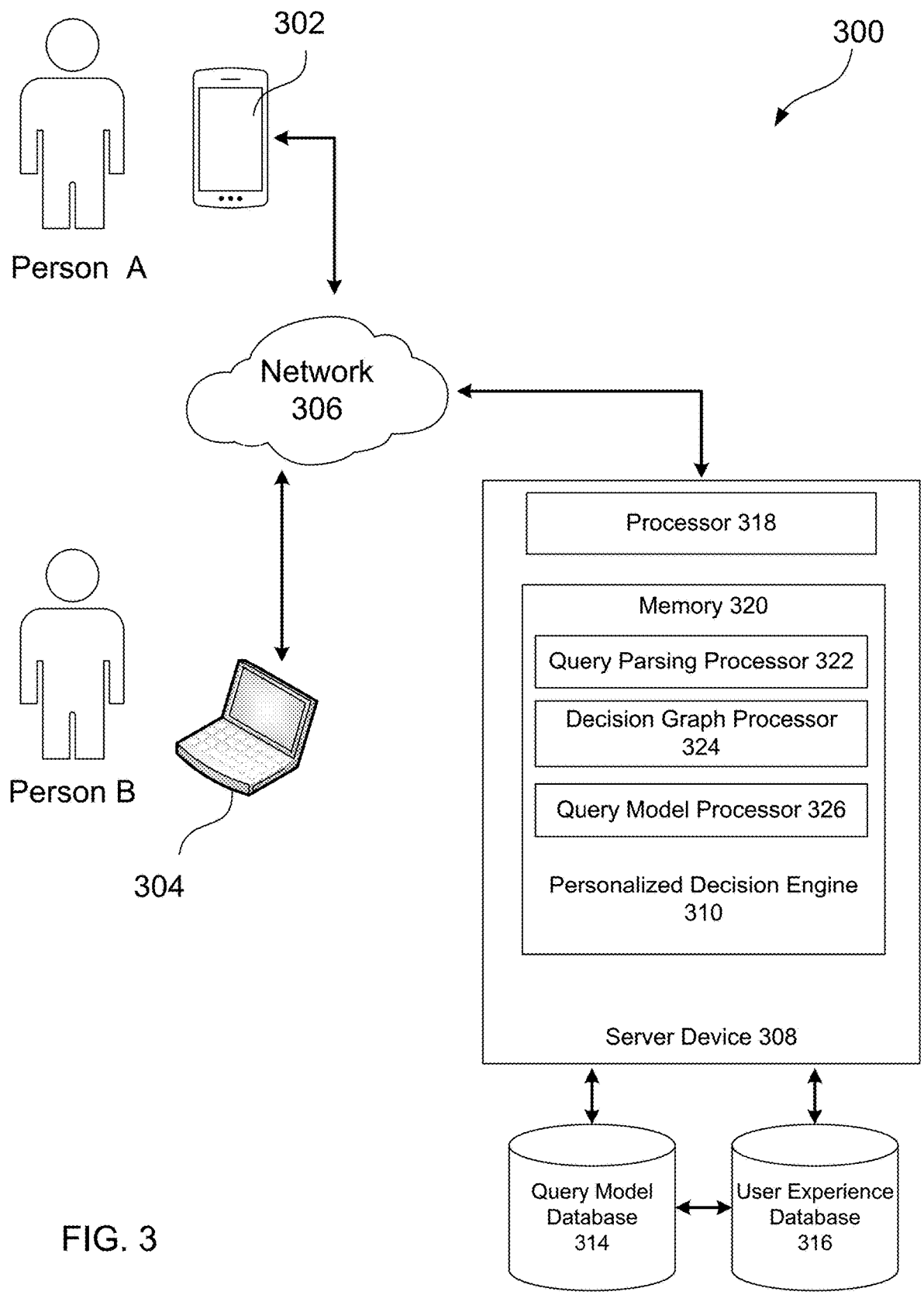
FIG. 3 is a schematic illustrating a diagram of an exemplary system for generating a personalized decision graph.

FIG. 3 is a diagram illustrating an exemplary system 300 configured to provide personalized responses to user queries. The system 300 may process the user queries by constructing a decision graph, such as the graph 100 described herein, and analyzing the decision graph to identify recommendations or answers that can aid the user in achieving their preferred metric. The subject matter of the present disclosure is not limited to the configuration shown with system 300 and may operate, and be embodied in, other systems as well.

As shown in FIG. 3, client devices 302, 304 are coupled to network 306. In general, a client device may be any type of processor-based platform connected to a network 306 and that interacts with one or more application programs. Network 306 may include a network of interconnected devices, such as the Internet. Through the client devices 302, 304, users (e.g., Person A and Person B) can communicate over the network 306 with each other and with other systems and devices coupled to the network 306. Though only two client devices 304, 306 are shown in FIG. 3, the present disclosure does not limit the number of client devices connected to network 306. Examples of client devices 302, 304 are personal computers, digital assistants, personal digital assistants, cellular phones, mobile phones, smart phones, digital tablets, laptop computers, and similar types of systems and devices.

A server device 308 also is coupled to the network 306. The server device 308 shown includes a server executing a personalized decision engine application program 310. Similar to the client devices 302, 304, the server device 308 shown includes a processor 318 coupled to a computer readable memory 320. Though server device 308 is depicted as a single computer system having a single processor 318, server device 308 may be implemented as a single computer system with multiple processors or a network of computer systems with multiple processors for executing programs according to the present disclosure. Examples of server device 308 include servers, mainframe computers, networked computers, a processor-based device and similar types of systems and devices. Server processor 318 can be any of a number of well-known computer processors, such as processors from Intel Corporation of Santa Clara, Calif. and Motorola Corporation of Schaumburg, Ill.

Memory 320 of server device 308 contains a personalized decision engine application program, also known as a decision engine 310 that may be executed by processor 318. In some implementations, the decision engine 310 includes a query parsing processor 322, a decision graph processor 324, and a query model processor 326. Query parsing processor 322 is configured to parse queries received by server device 308 to identify the category of question being asked and to identify a relevant query model to apply to the query so that an appropriate decision or recommendation may be provided to a user. Decision graph processor 324 is configured to construct a decision graph, in which the decision graph represents a probability of user achieving a defined metric based on different possible decisions the user may make over a defined period of time. The decision graph may be a computational construct, such as a matrix, and does not necessarily correspond to a visual representation. Query model processor 326 is configured to apply a selected query model to user experience data, such as in the form of a decision graph, to identify correlations and, from the identified correlations, at least one recommendation or answer to provide to a user in response to the query.

Figure 4:
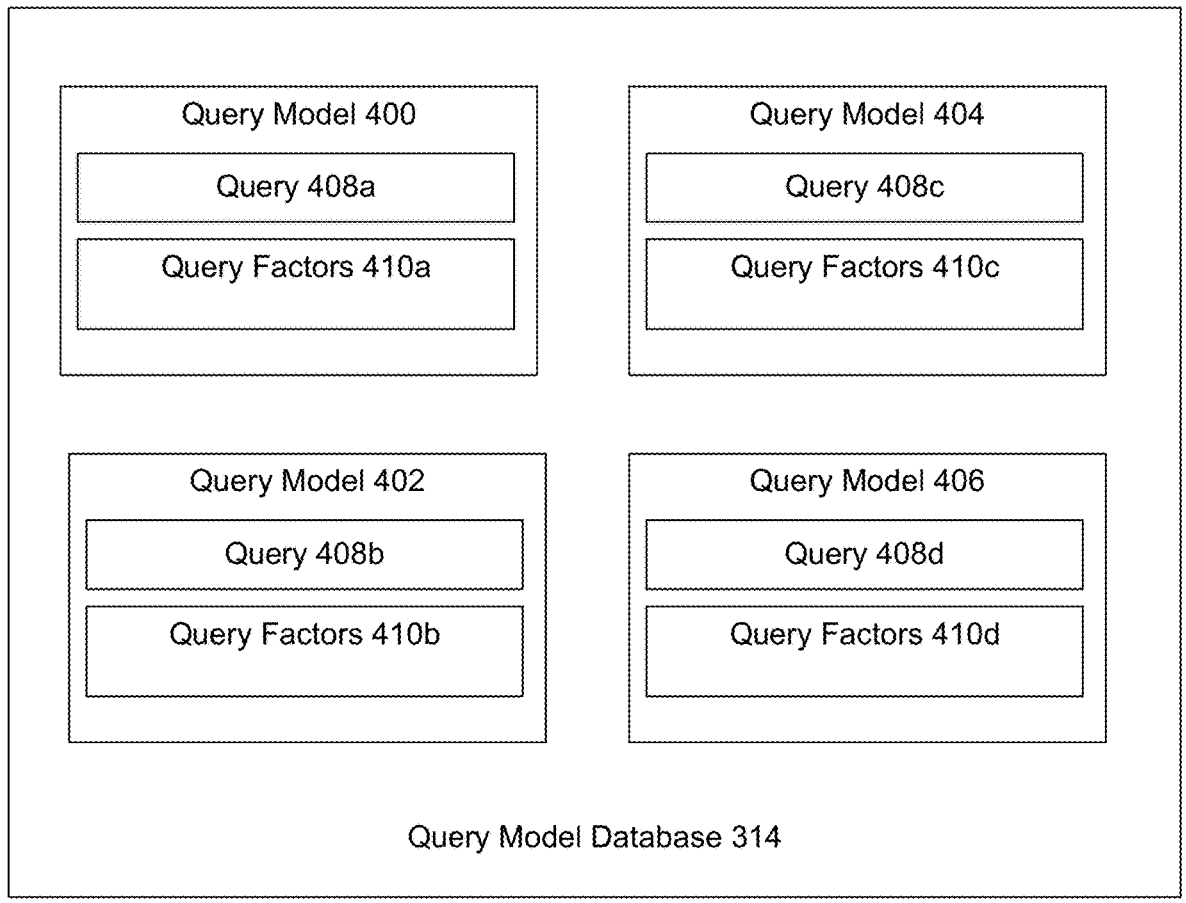
FIG. 4 is a schematic that illustrates examples of different query models that may be stored in query model database

Server device 308 also may include or provide access to other storage elements. For example, server device 308 may provide access to query model database 314 and user experience database 316. In the example, query model database 314 stores different query models. FIG. 4 is a schematic that illustrates examples of different query models 400, 402, 404 and 406 that may be stored in query model database 314. Each query model shown in FIG. 4 includes a unique query (408a-408d) and an identification of at least one factor (410a-410d) required to answer the query (408a-408d). For example, query model 400 may include a question, such as "Should I move to a new city?", as well as relevant factors that would be useful in providing a recommendation or answer to that query. Such relevant factors may include information about where a user currently lives, what is the user's occupation, how much income does the user receive, does the user have a family, how old is the user, and the user's financial goals, among other possible items of information. Another relevant factor may include what is the user's desired metric or metrics (e.g., health, happiness and/or wealth) for making the decision. In another example, the query model 402 may include a question such as "Should I purchase a car?" Query model 402 may further identify relevant factors for answering that question such as whether and what type of vehicle the user currently uses, whether the user owns or leases their current vehicle, the type of vehicle the user currently uses, the income level of the user, the user's financial goals, and the amount of travel by the user over a defined period of time, among other possible items of information.

Though the queries (408*a*-408*d*) are identified in the foregoing examples as being a specific question form, query models are not limited to acting on a single form of query. Rather, a query may have various different forms and can still be associated with a particular query model. For example, the queries "Should I move to Boston?", "Should I move from my home town?", and "Would I be happier in Portland?" may all be associated with and answered by query model 400. For example, in some implementations, the query parsing processor 322, upon receiving a query, may apply language processing to identify a basic category or class to which the query pertains (e.g., "Would I be happier if I moved?"). Additional information contained within the original query (e.g., Boston or Portland being the destination location, home town being the origin location, and happiness being a user defined metric) may be used to fill in factors that are necessary for the query model to provide a recommendation or answer to the user.

Figure 5:
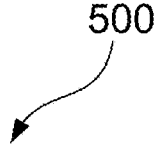
FIG. 5 is a schematic that illustrates an exemplary user experience storage element.

Referring again to FIG. 3, server device 308 also provides access to other storage elements, such as a user experience storage element. In the example, user experience storage elements are stored in user experience database 316. User experience storage elements may include, for example, information characterizing the state of different users over time, as well as decisions the users may have made during that time. FIG. 5 is a schematic that illustrates an exemplary user experience storage element 500 for a user (Person A) that may be stored by user experience database 316. The storage element 500 is graphically represented as a matrix, but may be stored in alternative forms by the system. Information contained within storage element 500 and characterizing Person A's state may include, e.g., demographic information 502 such as the user's occupation, income, sex, marital status, literacy or education level, weight, and geographical location, among other demographic information. Information characterizing a user's state may also include lifestyle information 504 characterizing the user's lifestyle such as, for example, eating habits, sleeping habits, and exercising habits, among other lifestyle information. Information characterizing a user's state may also include decision information 506 about different decisions that the user has made at different points in time in their life, as well as feedback information 508 about how the decision may have affected the user. The feedback information 508 may be in the form of a numeric value indicative of how well or how poorly the decision improved the user's desired metric.

The different categories of information (502, 504, 506, and 508) may be stored and arranged relative to particular time frame, such as the user's age 510. For example, the storage element 500 may include demographic information (D1 to D6), lifestyle information (L1 to L6), decision information (A1 to A6), and feedback information (F1 to F6) for the user at different points in time of the user's life (e.g., between ages 26-36). Thus, user experience storage element 500 characterizes different states of the user's life over time. The user experience storage element 500 may be populated by asking different users (e.g., Person A and Person B) direct questions and recording their responses at different points in time.

In some implementations, the decision information 508 may be further categorized using information from the query model database 314. For example, the different decisions made by the user can be categorized as answers or decisions to one or more of the queries identified in one or more query models, respectively. Furthermore, the system can anonymize the information aggregated within the user experience database in a privacy preserving manner. The data storage elements, such as data storage elements stored by databases 314, 316, may include any one or combination of methods for storing data, including without limitation, arrays, hashtables, lists, and pairs. Other similar types of data storage devices can be accessed by the server device 308.

Figure 6:
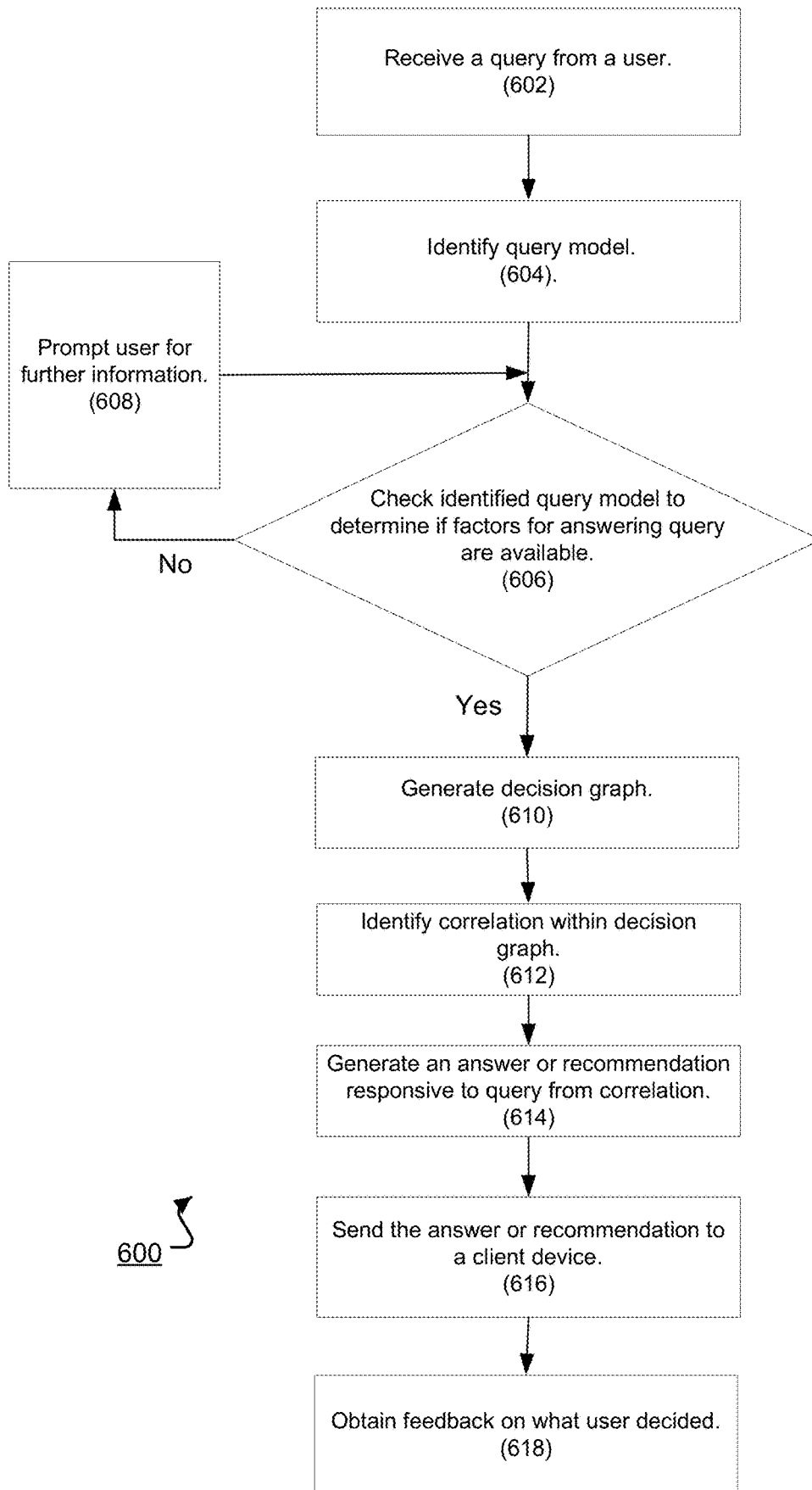
FIG. 6 is a flow-chart depicting an exemplary process for operating a personalized decision engine.
Figure 7:
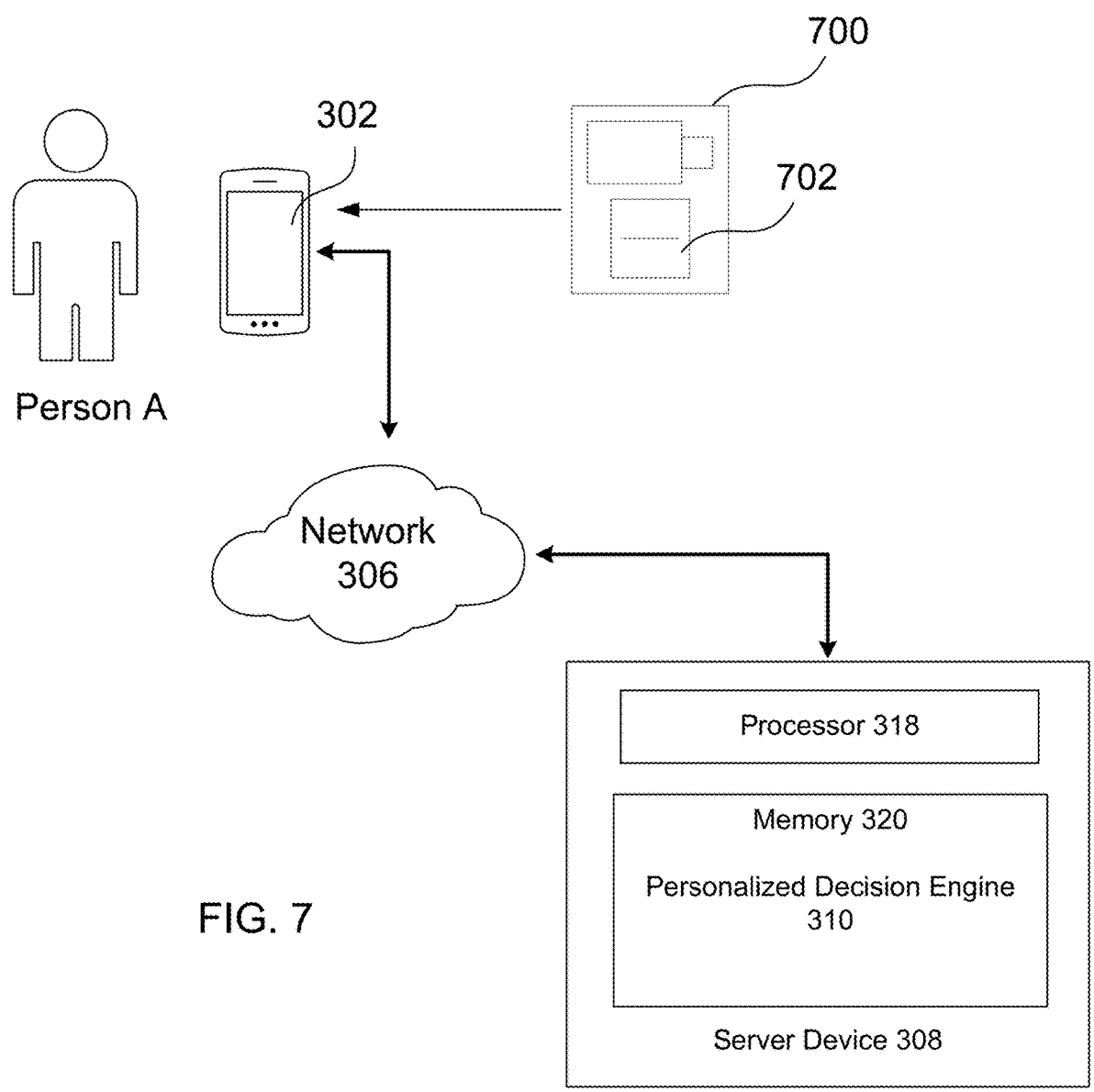
FIG. 7 is a schematic that illustrates an exemplary scenario in which a sensor provides user feedback.

The exemplary system 300 shown in FIG. 3 may be used to explain the exemplary methods shown in FIGS. 6-7. FIG. 6 is a flow-chart depicting an example process for operating a personalized decision engine, such as decision engine 310. In a first step (602), a user (e.g., Person A) submits a query to the system 300. The user may submit the query by entering the query into their client device (e.g., device 302). For instance, the client device 302 may be a digital assistant to which the user can speak directly and submit the query. Other methods of entering the query, such as typing the query into the client device 302, are also possible. Queries may include open-ended questions such as "Where should move?" or "What car do I buy?". The query then is passed, as part of step 602, by device 302 through network 306 to server device 308. In some implementations, the user does not actually enter the query in step 602. Rather, in some cases, the server device 308 prompts the user with an unsolicited query. For example, in some implementations, the personalized decision engine 310 may send an instruction to client device 302 to ask the user a question. In response, the client device 302 may prompt the user with the question provided by decision engine 310. The prompt may be provided, e.g., audibly by a digital assistant or in the form of text displayed on a screen of device 302.

In the case that the user generates the query, a query model, such as an optimal query model, is identified (604) from the query. Identifying a query model, such as an optimal query model, may be accomplished through a query parsing processor 322 that performs various operations on the received query such as natural language processing and category and/or classification identification. The query parsing processor 322 may check the query model database 314 to determine if a query model is available for the identified category or class of the query. If no category is available, the decision engine 310 may generate a new query model for that query category or class.

If a query model to which the query belongs is identified, the decision engine 310, through query model processor 326, may check (606) the identified query model to determine what factors (e.g., factor 410) might be needed to answer the query. The factors needed for answering the query may also define the "state" of the user that submitted the query. For instance, the query model processor 326 may determine that the identified query model requires knowledge of certain demographic information and lifestyle information about the user, as well as the user's age, to provide an answer or recommendation. The decision engine 310 may check whether that required user information already is available in the user experience database 316 or if that information needs to be obtained from the user. If the relevant factors are not already stored in the user experience database 316 for the user, then the process 600 proceeds to step (608), where the decision engine 310 prompts the user for additional information. For example, the decision engine 310 may send an instruction to client device 302 to prompt the user (e.g., by using a digital assistant or through displaying text on a screen) for the additional information.

When the user provides the information requested by the prompt, the information is sent from client 302 to server 308 and stored in user experience database 316. The process 600 returns to step (606) where the identified query model is checked again to ensure that the required information from the user is available.

When all the information that the identified query model requires is provided or is available from database 316, the user state associated with the user (e.g., Person A) initiating the query is defined. Decision graph processor 324 then generates (610) a decision graph. Generation of the decision graph may entail, for example, identifying other users, from the user experience database 314, who may have, at one time or another, been associated with similar user state information as Person A. That is, the decision graph processor 324 may review the data entries within the database 314 to identify users that have had the same or similar characteristics as the characteristics defined in the user state for Person A. For example, if Person A is characterized as having a certain demographic (e.g., occupation, income, geographic location) and lifestyle (e.g., exercises regularly) characteristics at age 32, the decision graph processor 324 identifies other users (e.g., Person B) that may have had the same or similar characteristics at the same or similar age. Similarity in characteristics may be understood as meaning that not all the characteristics are the same (e.g., 2 out of 3 or 4 out of 6 characteristics are the same). Alternatively, or in addition, similarity may be understood to mean that the characteristics are similar in a qualitative aspect (e.g., the geographic locations in which the users live may be different, but similar in terms of density, neighborhoods, and relative location to cities, etc.). Identifying users having similar states as Person A may also entail identifying users that have asked or been presented with questions similar to the query.

Once similar users have been identified, the state information associated with those identified users, including decisions they have made, as well as feedback information pertaining to those decisions, are collected from database 316 and aggregated into a decision graph (such as decision graph 100). The resulting decision graph may include a plot of a particular metric (e.g., happiness, health, or wealth, among others) as a function of different decisions over the course of an extended period of time. The metric may be understood to be an aggregate metric determined by the feedback from the different users. For example, with respect to graph 100, the data, which is depicted in 3D, may be represented and traversed as separate 2D graphs, each of which has different statistical weights. The resulting decision graphs may be traversable using one or more different search algorithms, such as an A* search algorithm. A* search algorithms are used in pathfinding and graph traversal and include the process of plotting an efficiently traversable path between multiple points, called nodes. So, for instance, to identify a series of decisions that would lead to a peak value (e.g, a peak in a happiness, health or wealth metric), the decision graph 100 may include evaluating, according to an A* algorithm, different possible paths across nodes to the peak value, and identify the path requiring the shortest number of decisions.

Once the decision graph is constructed, the query model processor 326 identifies (612) correlations within the decision graph that are more likely than not to result in the user improving their desired metric. The correlations that are identified may be based on statistical weighting and node matching within the decision graph. For example, for the query, "Should I move?", the query model processor 326 might identify a correlation that shows people who at one time or another exhibited a similar user state as Person A and who moved to a particular city, e.g., Atlanta, had a high likelihood of substantially improving the desired metric (e.g., reaching one of the local maximums 108 in graph 100). In some implementations, the query model processor 326 may identify additional correlations that are indicative of certain decisions carrying a greater likelihood improving the user's desired metric. A given user can theoretically have any given state at any given time. And once a user makes a query (e.g., asks "should I move to boston"), the query model processor 326 identifies the relevant states for that user (essentially taking a "snapshot" of that user's state in time) and matches the user's pattern against other user "snapshots" taken when those other users asked the same or similar question. The best matches identified from the correlations then be presented to the user (e.g., as a raw analysis), or combined into a new answer.

In some implementations, a query may be unlikely to result in a match for the particular user state. However, in such cases, the decision engine 310 may identify a subset of user state parameters so that an answer can still be obtained. For example, a query such as "how do I find love?" raised by a 70 year old Billionaire who is blind and who lives near the north pole may be unlikely to have many matches. One or more user state factors (e.g., age, location, health, interests, among other factors) can be pivoted and matched against other pairs. Thus, the query model processor 326 may identify answers to "how do I find love?" in graphs generated for users that are 70 year olds only, users with blindness only, or users that are billionaires only, among other decision graphs, and then combine the individual graphs into new graphs weighted by match (e.g., decision graphs of blind billionaires, decision graphs of 70 year-old north pole residents, among others.) and so on, until a closest match to the user's state is generated.

The query model processor 326 then generates (614) at least one answer or recommendation to the user question from the identified correlations. For instance, using the above example, the decision engine may generate "moving to Atlanta" as an answer to the user's query. In some implementations, the query model processor 326 generates multiple answers to the user query and ranks the answers. For example, a first response to the query (e.g., moving to Atlanta) might be correlated with a first value for the user's desired metric in the decision graph, whereas a second response to the query (e.g., moving to Boston) might be correlated with a second value for the user's desired metric in the decision graph, in which the second value is less than the first value. In such a case, the first response would be ranked higher than the second response.

In some implementations, the answer generated by the query model processor 326 does not have to exactly match an answer or decision followed by a previous user. Instead, the query model processor 326 may be configured to also split and combine different prior decisions or answers from different questions into a unique new answer. For example, since the decision engine 310 is capable of applying natural language processing to understand the semantics of the user queries and the context of the feedback, the engine 310 may generate new and unique answers for a user using Generative Model algorithms for semantic text. An example of a generative models approach that may be used to construct unique speech is provided by WaveNet using DeepMind®. WaveNet is a deep generative model of raw audio waveforms that generates speech, which mimics human voice. Rather than use simply concatenative text-to-speech (TTS), WaveNet records real audio waveforms of human speakers and uses a fully convolutional neural network, in which the convolutional layers of the network have various dilation factors, to synthetically generate utterances. These new synthetically generated utterances or values then are fed back into the system as input and new predictions are made. In a similar way, the queries and responses recorded by the decision engine 310 may be provided as inputs to a fully convolutional neural network executable by the decision engine 310. The neural network may generate new queries and/or responses and feed these new queries and/or responses back into the network to substantially grow the different possible queries and responses.

Following identification of the at least one answer to the user's query, the decision engine 310 may send (616) to the client device 302 the at least one answer or recommendation. Upon receiving the at least one answer or recommendation, the client device 302 may present the answer(s) or recommendation(s) to the user, e.g., audibly through a digital assistant, by displaying the answer or recommendation on a screen, or through haptic feedback.

Should the user decide to follow the answer or recommendation, or not, the decision engine 310 may obtain (618) feedback from the user as to what decision the user decided to make. The feedback may be obtained directly, e.g., by sending, from decision engine 310, the user a request through client device 302. The user may respond to the request with feedback information about their decision. For example, if the user decided to move to Boston, the user may provide that information to client device 302 which, in turn, would inform the decision engine 310. Alternatively, if the user decided to stay, the user may provide that information, through client 302, to the decision engine 310. In some implementations, the user may provide additional information to the decision engine 310. The additional information may include, e.g., a reason why the user made their decision. The additional information may include, e.g., the impact of the decision on one or more metrics identified by the user. For instance, the user may submit as feedback a numeric value selected from a predetermined range (e.g., between −10 and 10 or between 0 and 10) to indicate how much the user perceives the decision as helping reach the user's desired level of happiness.

In some implementations, feedback regarding the decision may be obtained indirectly. For example, feedback may be obtained using sensors in the client device 302 (e.g., a camera or microphone), sensors attachable to the user, or sensors attachable to clothing the user wears. FIG. 7 is a schematic that illustrates an exemplary scenario in which a sensor in the client device 302 or sensor 700 may provide user feedback. The sensor in device 302 and/or sensor 700 may include, e.g., microphones (detecting a variety of audio input including voice levels, tonality, shiver, mumbling, pauses, and rhythm); image and/or video cameras that can perform facial recognition and mental state classification (e.g., sad, surprised, focused), and that can detect for example body posture and/or pace; and/or wearable sensors and touch sensors. Other sensors are also possible. In the example of FIG. 7, sensor 700 includes a camera that is positioned on or near Person A. Sensor 700 may also include a transceiver 702 that is configured to transmit measurement signals to device 302 using, e.g., wireless technology such as Wi-Fi, Bluetooth® or cellular. In turn, device 302 may transmit the measurement signals received from sensor 700 to server device 308, where the measurement signals are obtained by decision engine 310. Similarly, device 302 may transmit measurement signals recorded by sensors within device 302 to server device 308, where the measurement signals then are obtained by decision engine 310. Decision engine 310 may be configured to derive feedback data from the measurement signals. For example, decision engine 310 may be configured with facial recognition software that analyzes recorded video of the user's facial expressions for indicators (e.g., smiles, furrowed eyebrows, and direction of focus of eyes) of happiness or sadness. In another example, the decision engine 310 may be configured with audio recognition technology that analyzes the user's recorded voice for indicators (e.g., voice levels, tonality, shiver, mumbling, pauses, and rhythm) of happiness or sadness.

In some implementations, the user may allow decision engine 310 access to software applications that provide relevant feedback information. For example, the user may allow decision engine 310 access to a software application that provides information about the user's financial status, from which the decision engine 310 may obtain feedback about increases or decreases in the user's wealth status following decisions made by the user.

One the feedback information is obtained by decision engine 310, the feedback information may be used by decision engine 310 to update the user's state information as stored in user experience database 316.

All or portions of the exemplary process 600 described with respect to FIG. 6 may be performed in real-time. For instance, all or portions of the exemplary process 600 may be performed within the order of several seconds. Accordingly, the process of providing a response to a user query can be performed in a relatively quick time frame compared to redirecting a query to an actual human expert, waiting for the expert's reply, and relaying the expert's reply to the user.

Figure 8:
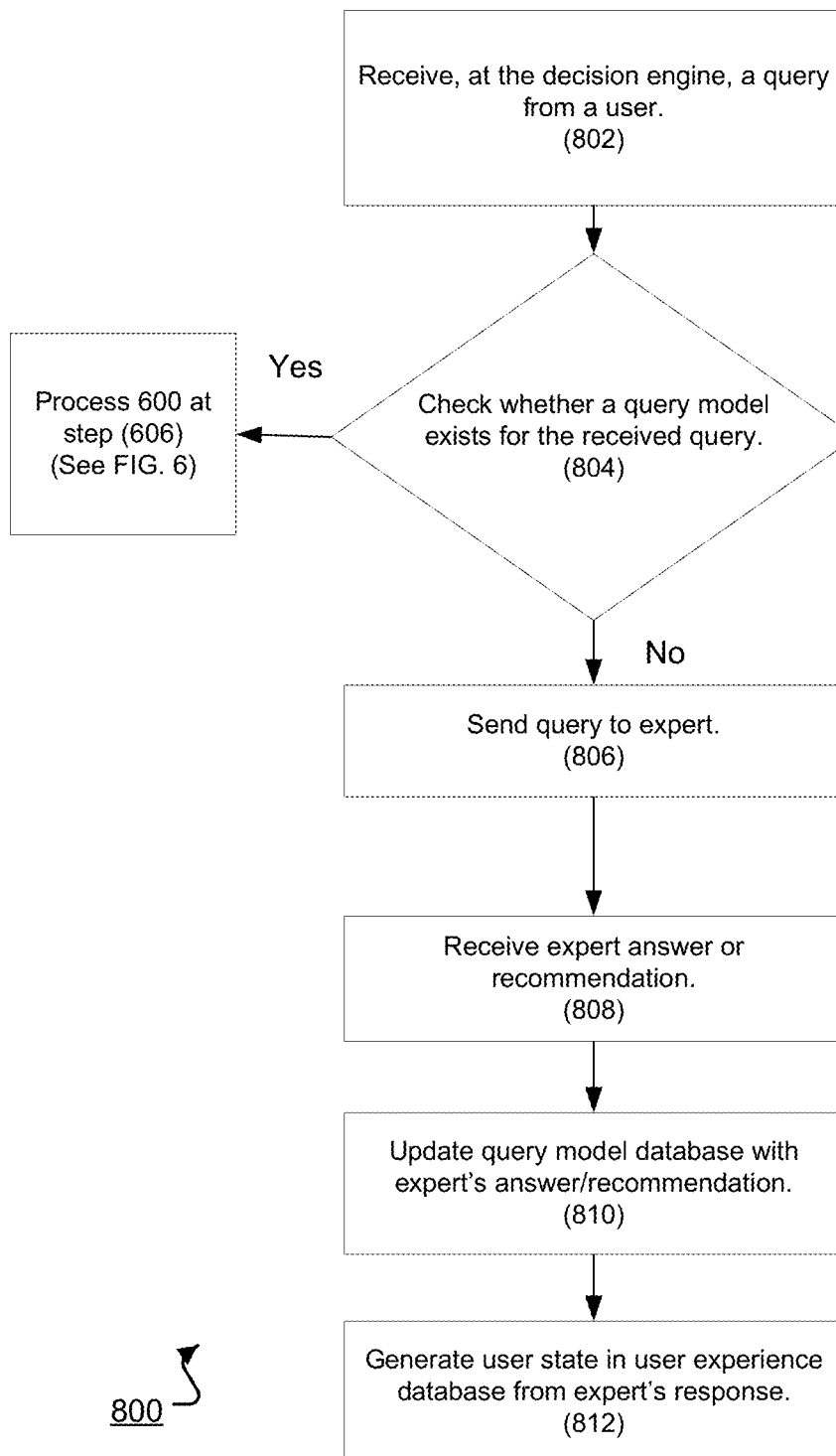
FIG. 8 is a schematic that illustrates an exemplary process for seeding a query model database and/or a user experience database.

Because the user experience database 316 and the query model database 314 rely, in part, on user feedback and the pre-existing availability of query models, the databases 314, 316 initially may lack query models and/or sufficient user state data to generate decision graphs for certain queries. Accordingly, the databases 314, 316 may be pre-seeded with information, e.g., information from experts. The process for seeding the user experience database 316 may be performed manually (e.g., based on manual data entry into the database 316) or automatically by the decision engine 310. FIG. 8 is a schematic that illustrates an exemplary process 800 for seeding a query model database and/or a user experience database. The process 800 is described with respect to system 300, but the process may be applicable to variations of system 300 as well. In a first step (802), a user submits a query to the decision engine 310 (e.g., by entering the query into client device 302, which then transmits the query to server device 308). Upon receiving the query, the decision engine 310 parses the query and checks (804) whether a query model exists for the question asked. If a query model exists, the process 800 uses that query model, e.g., by following the process 600 and beginning at step (606) (see FIG. 6). If no query model exists, then decision engine 310 generates a new query model in database 314 for that particular query. Subsequently, the decision engine 310 or an operator monitoring the decision engine 310 may pass (806) the question to a person considered to be an expert in the field to which the question pertains. Experts may be self-identified. Alternatively, or in addition, experts may have been pre-identified as experts for selected categories. For example, Person B may be considered to be an expert in the relevant field to which the query pertains. The decision engine 310 may transmit a request through network 306 to client device 304 for Person B to provide a recommendation or answer to the query. Upon receiving the request, Person B may respond with an answer or recommendation based on that user's expertise. In some implementations, the answer or recommendation may also include an identification of what factors that the expert considers relevant for answering the question. The answer or recommendation (and any relevant factors) may be transmitted from device 304 back through network 306 to decision engine 310. The decision engine 310 receives (808) the expert answer or recommendation (and any relevant factors) and then updates (810) the query model in database 314 to which the answer or recommendation pertains. The decision engine 310 also may generate a new user state within the user experience database 316 using the information provided by the expert. For instance, the decision engine 310 may generate (812) a user state that identifies the relevant factors the expert considered (e.g., demographics, age, lifestyle information) as well as the answer or recommendation from the expert to the particular query. The decision engine 310 also may associate the answer with a value indicative of the expert's opinion as to how much the answer or recommendation would improve any metrics relevant to the user (e.g., happiness, wealth or health).

Figure 9:
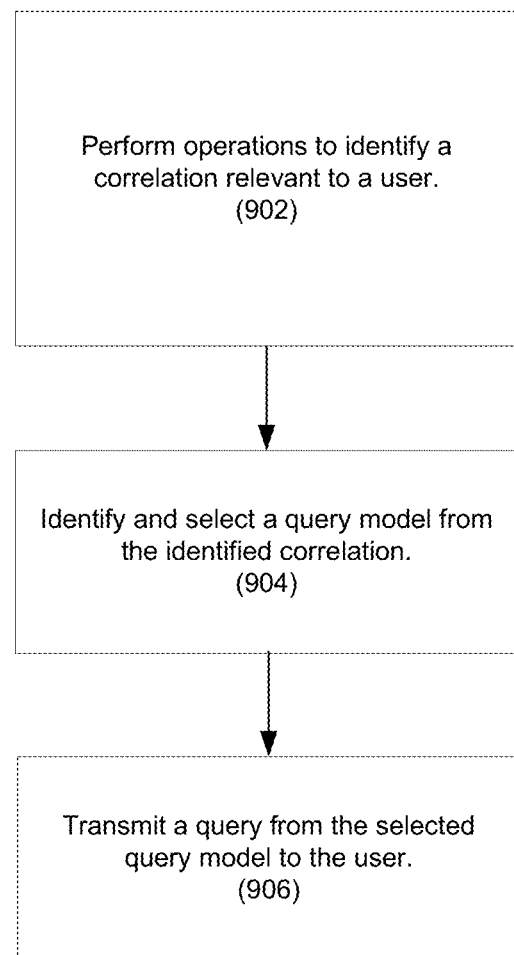
FIG. 9 is a schematic that illustrates an exemplary process for spontaneously prompting a user with a query.

Other implementations of the processes described herein are also possible. For example, in some implementations, the system 300 may spontaneously prompt the user with a query, rather than waiting for a query from the user. FIG. 9 is a schematic that illustrates an exemplary process 900 for spontaneously prompting a user with a query. In the process 900, the decision engine 310 periodically performs operations to identify (902) correlations that may be relevant to the particular user (e.g., Person A). For example, the decision engine 310 may check Person A's current state information against a decision graph for other users that have or have had similar state information at a point in time. The decision engine 310 may check such a graph regularly or intermittently. For instance, the decision engine 310 may check the graph once per day, once per week, once per month, or once per year, among other periods. From the decision graph, the decision engine 310 then may identify correlations associated with different user decisions that result in improvements in the metrics relevant to Person A. For example, the decision engine 310 may identify a correlation showing that users who chose to move to Atlanta tend to have higher metrics (e.g., happiness, wealth, or health) than users that do not move. In some implementations, the decision engine 310 may identify statistically significant correlations having a low probability of error (e.g., less than 5%, less than 3% or less than 1%).

From the identified correlation(s), the decision engine 310 then may identify and select (904) one or more corresponding query models. In particular, the decision engine 310 may identify the decision associated with the correlation (e.g., the decision associated with the improved metric value) and determine what query the decision may have been in response to. For example, upon identifying which kinds of users are generally happier upon moving to Atlanta, the decision engine 310 may identify the query as relating to whether the user should move. The decision engine 310 then will search the query model database 314 for a query model that matches the identified query.

Upon locating a query model that matches the identified query, the decision engine 310 transmits (906) the question from the query model to the user. For instance, the decision engine 310 may transmit the question associated with the query model to client device 302, which, in turn, outputs the question to Person A (e.g., through a digital assistant or by displaying text on a screen).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising:
   at least one processor; and
   at least one memory device comprising
   a) a user experience database comprising a plurality of user experience data entries, wherein each user experience data entry comprises data, for a corresponding user, characterizing decisions made by the corresponding user and outcomes for the corresponding user at a plurality of different points in time over a time period particular to the corresponding user, and
   b) a query model database comprising a plurality of query models, wherein each query model of the plurality of query models comprises a unique question and an identification of at least one factor necessary to answer the question, and wherein each query model is configured to identify correlations when the query model is applied to user experience data entries from the user experience database, and
   c) processor instructions that, when executed by the at least one processor, cause the at least one processor to perform operations comprising:
   applying a first query model from the query model database to the plurality of user experience data entries from the user experience database, to obtain at least one correlation resulting from the application of the first query model; and
   generating an answer to the question of the first query model from the at least one correlation.

2. The apparatus of claim 1, wherein the instructions, when executed by the at least one processor, cause the at least one processor to perform operations comprising:
   obtaining a plurality of correlations resulting from the application of the first query model to the user experience database;
   ranking the plurality of correlations to provide a ranked plurality of correlations; and
   generating the answer to the question of the first query model according to the ranked plurality of correlations.

3. The apparatus of claim 1, wherein the instructions, when executed by the at least one processor, cause the at least one processor to perform operations comprising:

applying, for the user, the first query model to the plurality of user experience data entries for a specified timeframe.

4. The apparatus of claim 1, wherein the instructions, when executed by the at least one processor, cause the at least one processor to perform operations comprising:
outputting the answer as a recommendation;
obtaining feedback on the effect of the answer to the user's life experience; and
updating the user experience database with the feedback.

5. The apparatus of claim 4, wherein the feedback comprises a measurement signal obtained from a sensor device.

6. The apparatus of claim 1, wherein the instructions, when executed by the at least one processor, cause the at least one processor to perform operations comprising:
receiving, from a computer-implemented peripheral device, a query from the user; and
identifying, from the query database, the first query model.

7. The apparatus of claim 1, wherein the instructions, when executed by the at least one processor, cause the at least one processor to perform operations comprising:
periodically analyzing the user experience database to identify correlations that are relevant to the user;
selecting, based on the correlations that are relevant to the user, the first query model; and
outputting, to a computer-implemented peripheral device, the question from the first query model.

8. A computer-implemented method, the method comprising:
receiving, by at least one processor, a query transmitted from a client device;
identifying, by the at least one processor, a first query model using a query database; a query model database comprising a plurality of query models, wherein each query model of the plurality of query models comprises a unique question and an identification of at least one factor necessary to answer the question,
applying, by the at least one processor, the first query model to a plurality of user experience data entries from a user experience database,
wherein each user experience data entry comprises data, for a corresponding user, characterizing decisions made by the corresponding user and outcomes for the corresponding user at a plurality of different points in time over a time period particular to the corresponding user,
wherein at least one correlation results from the application of the first query model; and
identifying, by the at least one processor, an answer to the query from the at least one correlation.

9. The method of claim 8, further comprising:
obtaining a plurality of correlations resulting from the application of the first query model;
ranking the plurality of correlations to provide a ranked plurality of correlations; and
identifying the answer to the query from the ranked plurality of correlations.

10. The method of claim 8, further comprising:
applying the first query model to the plurality of user experience data entries for a specified time frame.

11. The method of claim 8, further comprising:
outputting, to the client device, the answer as a recommendation;
obtaining feedback on the effect of the identified answer to a user's life experience; and
updating the user experience database with the feedback.

12. The method of claim 11, wherein the feedback comprises a measurement signal obtained from a sensor device.

13. The method of claim 8, further comprising:
periodically analyzing the user experience database to identify correlations that are relevant to a user;
selecting, based on the correlations that are relevant to the user, a second query model; and
output, to the client device, a question from the second query model.

14. Computer-readable non-transitory storage media encoded with instructions that, when executed by one or more computers, cause the one or more computers to perform operations comprising:
receiving a query transmitted from a client device;
identifying, by the one or more computers, a first query model using a query database; a query model database comprising a plurality of query models, wherein each query model of the plurality of query models comprises a unique question and an identification of at least one factor necessary to answer the question,
applying the first query model to a plurality of user experience data entries from a user experience database, to obtain at least one correlation resulting from the application of the first query model; wherein each user experience data entry comprise data, for a corresponding user, characterizing decisions made by the corresponding user and outcomes for the corresponding user at a plurality of different points in time over a time period particular to the corresponding user, and
identifying an answer to the query from the at least one correlation.

15. The computer-readable non-transitory storage media of claim 14, the operations further comprising:
obtaining a plurality of correlations resulting from the application of the first query model;
ranking the plurality of correlations to provide a ranked plurality of correlations; and
identifying the answer to the query from the ranked plurality of correlations.

16. The computer-readable non-transitory storage media of claim 14, the operations further comprising:
applying the first query model to the plurality of user experience data entries for a specified time-frame.

17. The computer-readable non-transitory storage media of claim 14, the operations further comprising:
outputting, to the client device, the identified answer as a recommendation;
obtaining feedback on the effect of the identified answer to a user's life experience; and
updating the user experience database with the feedback.

18. The computer-readable non-transitory storage media of claim 17, wherein the feedback comprises a measurement signal obtained from a sensor device.

19. The computer-readable non-transitory storage media of claim 14, the operations further comprising:
periodically analyzing the user experience database to identify correlations that are relevant to a user;
selecting, based on the correlations that are relevant to the user, a second query model; and
output, to the client device, a question from the second query model.

* * * * *